United States Patent [19]

Lawrence

[11] Patent Number: 5,450,975
[45] Date of Patent: Sep. 19, 1995

[54] SECONDARILY CONTAINED UNDERGROUND LIQUID STORAGE VESSEL AND METHOD OF CONSTRUCTION

[75] Inventor: James L. Lawrence, Exton, Pa.
[73] Assignee: Total Containment, Inc., Oaks, Pa.
[21] Appl. No.: 339,294
[22] Filed: Nov. 9, 1994

Related U.S. Application Data

[63] Continuation of Ser. No. 903,704, Jun. 26, 1992, abandoned.

[51] Int. Cl.⁶ ............................................. B65D 25/18
[52] U.S. Cl. ................................. 220/484; 220/456; 220/410; 220/656; 220/86.1
[58] Field of Search ..................... 220/484, 565, 4.12, 220/410, 656, 86.1

[56] References Cited

U.S. PATENT DOCUMENTS

| | | | |
|---|---|---|---|
| 2,739,917 | 3/1956 | Schulze | 154/83 |
| 2,914,169 | 11/1959 | Moore | 206/84 |
| 3,158,282 | 11/1964 | Houz | 220/63 |
| 3,372,075 | 3/1968 | Holt | 156/172 |
| 4,035,462 | 7/1977 | Lane, Jr. | 260/89 |
| 4,537,328 | 8/1985 | Keesee | 220/455 |
| 4,602,722 | 7/1986 | Ives | 220/414 |
| 4,625,892 | 12/1986 | Carlin | 220/465 |
| 4,640,439 | 2/1987 | Palazzo | 220/445 |
| 4,644,627 | 2/1987 | Palazzo | 29/423 |
| 4,651,893 | 3/1987 | Mooney | 220/445 |
| 4,655,367 | 4/1987 | Palazzo | 220/445 |
| 4,699,294 | 10/1987 | Carlin | 220/465 |
| 4,709,723 | 12/1987 | Sidaway et al. | |
| 4,744,137 | 5/1988 | Palazzo | 29/455 |
| 4,780,946 | 11/1988 | Palazzo | 29/455.1 |
| 4,780,947 | 11/1988 | Palazzo | 29/455.1 |
| 4,817,817 | 4/1989 | Palazzo | 220/445 |
| 4,913,310 | 4/1990 | Sharp | 220/445 |
| 4,927,050 | 5/1990 | Palazzo | 220/445 |
| 4,989,447 | 2/1991 | Gelin | 220/445 |
| 5,024,715 | 6/1991 | Trussler | 156/245 |
| 5,040,088 | 8/1991 | Webb | |
| 5,047,101 | 9/1991 | Trussler | 156/69 |
| 5,060,817 | 10/1991 | Trussler | 220/414 |
| 5,102,005 | 4/1992 | Trussler | 220/412 |

OTHER PUBLICATIONS

Hancor "Sewage Tank-300 Gallon" Copyright 1982.

*Primary Examiner*—Joseph M. Moy
*Attorney, Agent, or Firm*—Merek & Voorhees

[57] ABSTRACT

A fluid storage vessel and providing spacing protrusions for creating interstitial spaces to permit fluid flow about the outer wall of the inner tank to a collection zone where leaked fluid may be detected. Leak detection devices are provided to determine if the inner tank is leaking fluid. A sump base is formed during the rotomolding process to create a secondary containment layer including a sump base of one-piece construction. The sump base includes entry ports for facilitating the insertion of conduit to access the fluid stored in the fluid storage vessel. The method used to create the secondarily contained fluid storage vessel includes a rotomolding process which provides a seamless construction and eliminates mechanical connections of either the outer shell or the sump base and the shell.

18 Claims, 3 Drawing Sheets

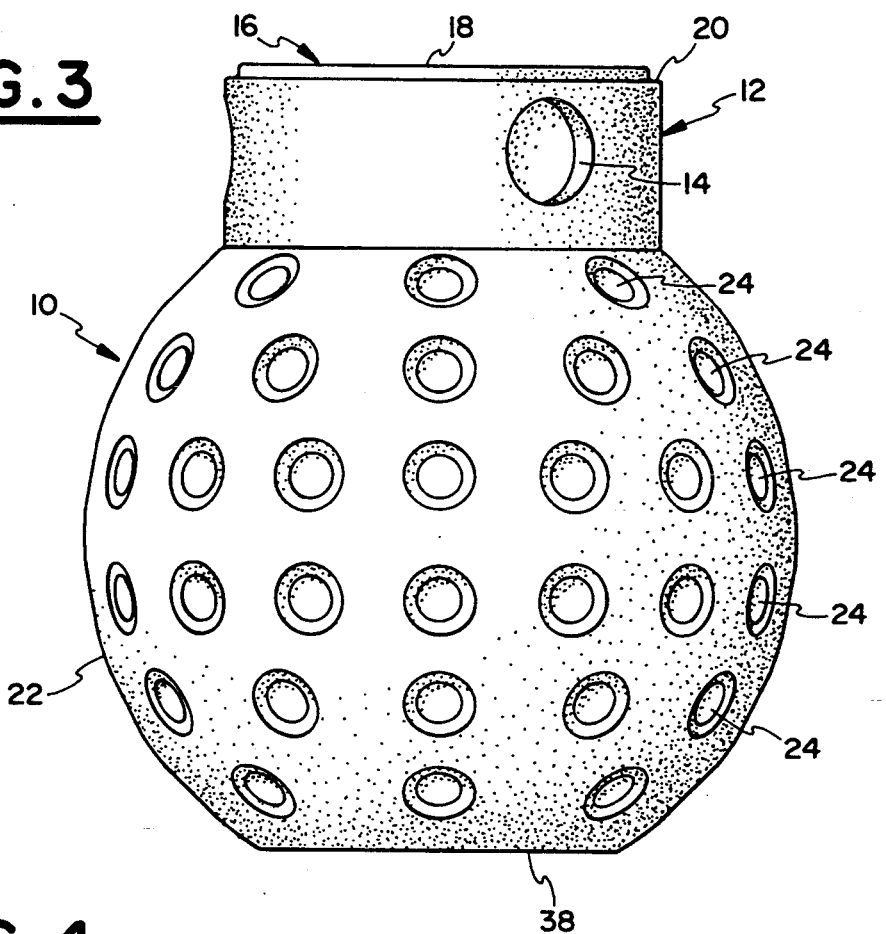
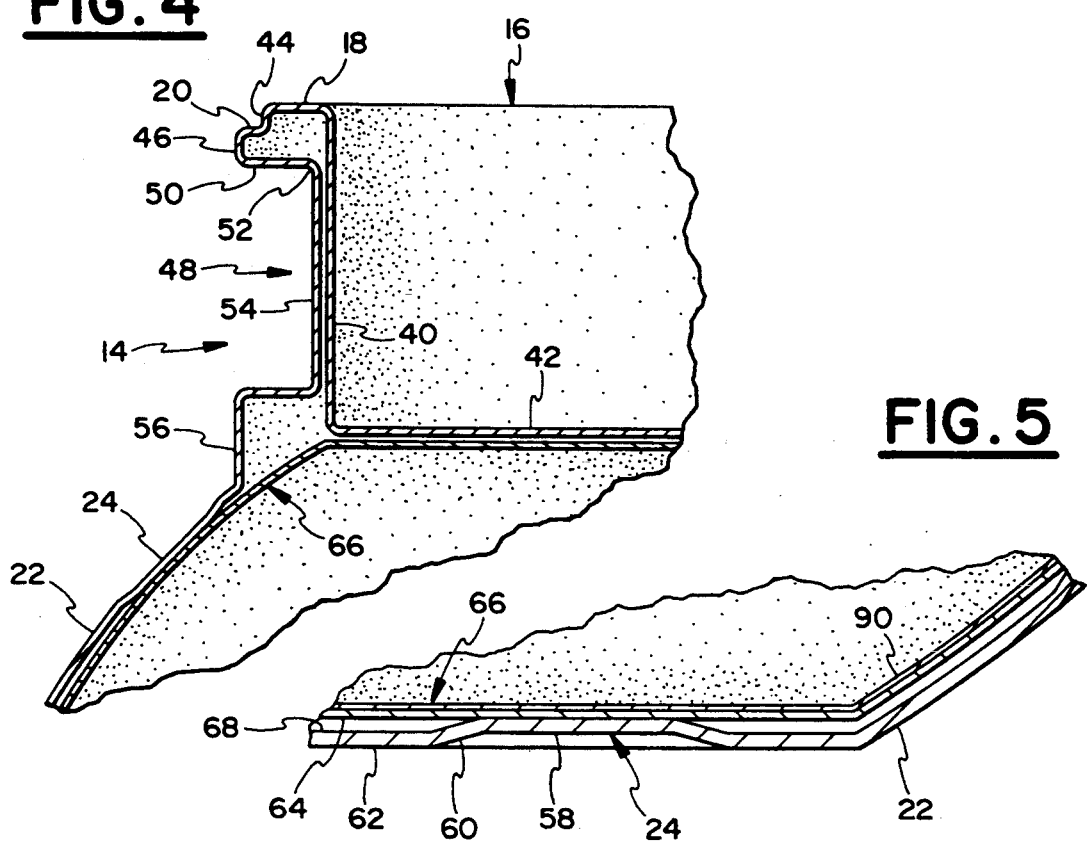

SECONDARILY CONTAINED UNDERGROUND LIQUID STORAGE VESSEL AND METHOD OF CONSTRUCTION

This application is a continuation of application Ser. No. 07/903,704, filed Jun. 26, 1992 now abandoned.

FIELD OF THE INVENTION

This invention relates to underground liquid storage vessels having composite construction and more particularly to fuel storage tanks including corrosion prevention coverings and adapted to utilize leak detection devices. Underground storage vessels of this variety are particularly suitable for use in fuel dispensing systems and is particularly adapted for those systems in use at airports, remote generator locations and other fuel distribution locations.

BACKGROUND OF THE INVENTION

Leakage from underground storage tanks have created many small pollution problems and some major disasters. Since fuels containing hydrocarbons flow into ground water aquifers, contamination of underground water supply can be serious and widespread. Hydrocarbon fuels contain substances which are extremely hazardous to wildlife and humans such as benzene. Clean up of spilled hydrocarbon liquids from the surrounding earth and ground water tends to be an extremely expensive proposition, far outweighing the cost of prevention.

Tanks for liquid storage such as gasoline, diesel fuel and other petroleum products have been constructed in various ways including composite construction from multiple materials including steel, fiberglass and plastics such as polyethylene. Many tanks are fabricated from steel which corrodes readily through contact with the surrounding earth and release of petroleum products into the ground is inevitable without cathodic protection. Fiberglass tanks, while resistant to corrosion are generally brittle and can be cracked through improper handling during shipping and also during backfilling operations. In view of the above problems, some solutions have been attempted which include providing a non-corroding covering for steel tanks. One example is shown in the U.S. Pat. No. 4,744,137. This encasing method includes wrapping a cylindrical tank with a plastic layer, welding the layer and then adding end caps to the tank and layer and welding on the end caps.

Federal Regulations have also required that leak detection be used in connection with underground storage tanks, and while several methods have been proscribed, that shown by U.S. Pat. No. 4,744,137 illustrates a common method which includes a pipe extending from an accessible location so that leaked fluid may be detected beneath the interior liner between the exterior shell. In order for the leak detection system to operate, interstitial spaces are provided to permit fuel leaking from the interior tank to flow to the bottom of the tank between the tank and the outer shell.

Generally, pumping components and piping ingress are located at the top of the tank. A leak containment sump-riser apparatus is generally joined to a manway at the top of the tank. Such a sump-riser assembly is shown, for example in U.S. Pat. No. 4,050,408. Attaching the sump riser apparatus to the manway generally includes connecting the sump-riser apparatus to the manway via a bolting flange on the manway and at the bottom end of the sump base.

In each of the prior assemblies, any time a mechanical connection is required, chance for leakage is present. In view of the foregoing, it can be seen that there is a need for a containment tank which eliminates the need for welded seams in the construction of the secondary containment layer and also eliminates unnecessary bolted connection between a manway and the sump-riser apparatus base.

FEATURES AND SUMMARY OF THE INVENTION

A principal feature of the invention is to provide a rotomolded secondary containment shell about an interior fluid storage vessel.

Another feature of the invention is to provide protrusions on the interior of the rotomolded secondary containment shell for spacing the secondary containment layer from the inner fluid storage vessel to provide interstitial spaces to permit the flow of leaked fluid from the inner vessel to a collection zone in the space between the secondary containment shell and the outer wall of the inner vessel.

Still another feature of the invention is to provide the rotomolded secondary containment shell of a seamless construction to eliminate the use of welding or adhesive to seal the secondary containment shell about the fluid containment vessel.

Yet another feature of the invention is to provide an integral sump base formed with the secondary containment layer to prevent unnecessary connections between the vessel manway and a sump-riser apparatus.

Still another feature of the invention is to provide preformed openings in the sump base portion of the secondary containment layer to provide conduit entry ports into the base portion.

Another feature is a method of constructing a composite tank and sump base using rotomolding techniques for forming a one-piece shell for a fluid storage vessel and a sump base.

Still another feature of the invention is to provide leak detection equipment within the fluid storage vessel to detect leakage from the inner tank into the interstitial space between the outer wall of the fluid storage vessel and the inner wall of the secondary containment shell.

In summary, therefore, the present invention is directed to a fluid storage vessel and providing spacing protrusions for creating interstitial spaces to permit fluid flow about the outer wall of the inner tank to a collection zone where leaked fluid may be detected. Leak detection devices are provided to determine if the inner tank is leaking fluid. A sump base is formed during the rotomolding process to create a secondary containment layer including a sump base of one-piece construction. The sump base includes entry ports for facilitating the insertion of conduit to access the fluid stored in the fluid storage vessel. The method used to create the secondarily contained fluid storage vessel includes a rotomolding process which provides a seamless construction and eliminates mechanical connections of either the outer shell or the sump base and the shell.

BRIEF DESCRIPTION OF THE DRAWINGS

FIG. 3 is a side view of the tank shown in FIGS. 1 and 2;

FIG. 4 shows a broken away and enlarged portion of the top of the tank shown in FIG. 3;

FIG. 5 in an exploded cross-sectional view of the side wall of the tank shown in FIG. 3 showing a cross-section of the dimpled area;

DETAILED DESCRIPTION OF THE INVENTION

Figure 1:
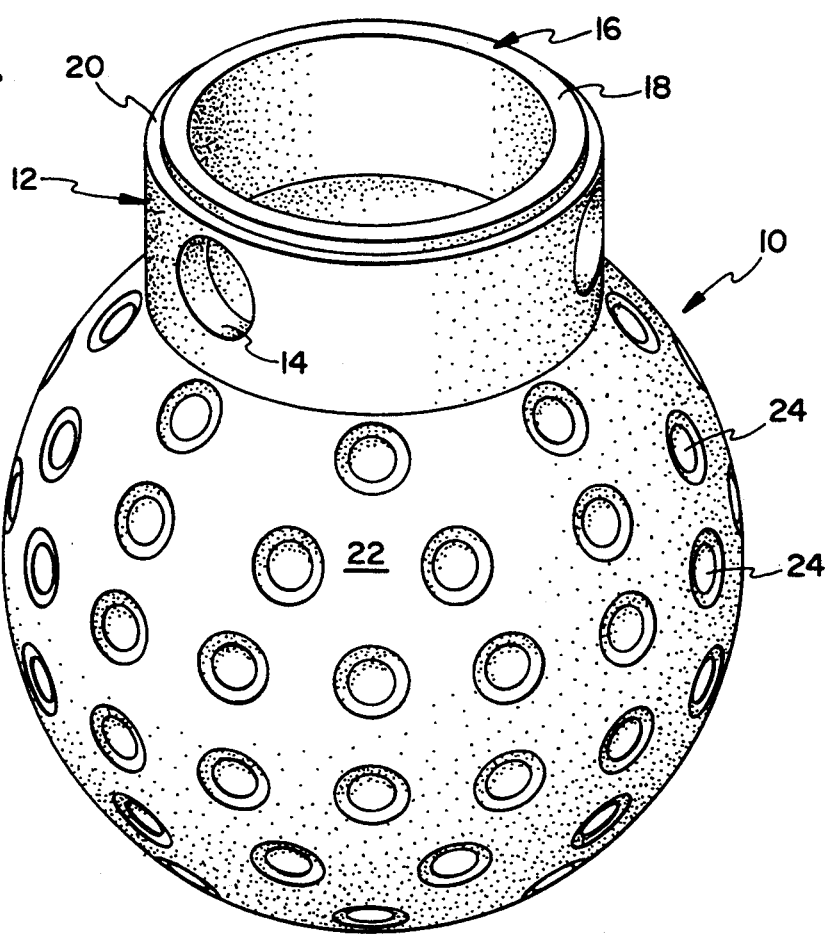
FIG. 1 is a perspective view showing the secondarily contained composite tank construction.

FIG. 1 shows a preferred embodiment of the secondarily contained fluid storage vessel 10. The vessel 10 is preferably formed of a generally spherical construction with a sump base portion 12 connected integrally thereto. Sump base 12 can be preferably formed with conduit access ports 14 formed therein. Conduit access ports 14 are more particularly shown with reference to FIG. 4. The sump base 12 also includes an upper edge 16. Upper edge 16 includes a flat surface 18 and an offset lateral and vertical recessed area 20 circumscribing upper edge 16.

Outer shell 22 of the secondarily contained fluid storage vessel 10 includes a plurality of dimpled areas 24.

Figure 2:
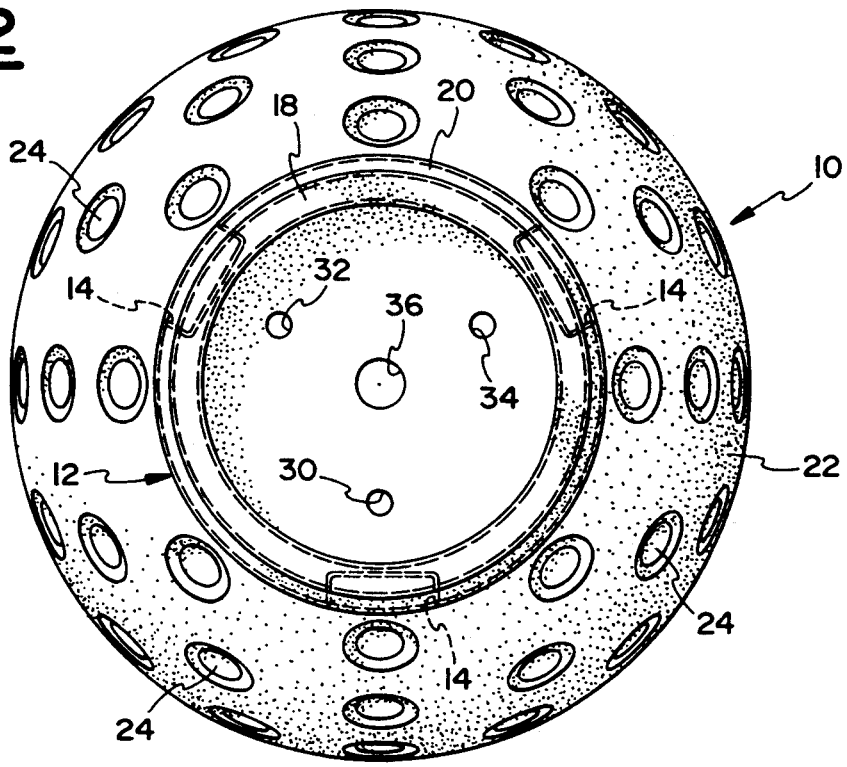
FIG. 2 is the top view of the tank showing FIG. 1.

FIG. 2 shows a top view of the vessel 10 illustrating the thickness of the access ports 14 and also shows the preferred location for placement of a leak monitoring tube 30 and vent opening 32 and a supply opening 34 and the extractor fitting/fill/return 36.

FIG. 3 shows a side elevational view of the tank and illustrates the truncated bottom wall 38. The flat bottom wall 38 provides a stable base for shipping and facilitates installation of the vessel 10. Dimples 24 are preferably aligned in spaced apart circumferential rings about the vessel 10.

FIG. 4 shows an exploded cross-sectional view of the sump base conduit access port 14 shown in FIG. 3. The sump base 12 includes an interior side wall 40 and a base 42 integrally formed with the lower end of interior side wall 40 while the upper edge 16 extends outwardly from the upper edge of the interior side wall 40 and includes a depending portion 44 connected to the flat surface 18 at one end and the laterally offset portion 20 at the other end. At the outer edge of offset 20 a depending wall portion 46 is formed which extends downwardly from offset portion 20 to cavity 48 which forms the conduit access port 14. Cavity 48 is surrounded by cuff 50. At the interior end 52 of cuff 50 is a side wall 54. During the forming process, side wall 54 may become bonded to interior side wall 40 should excess material be deposited in the region of sump base 12. This feature is not undesirable and in fact is preferred, but may not occur in every instance of rotomolding a vessel 10. The lower portion of cuff 50 joins a substantially vertical side wall section 56 which is integral with and joins to the outer side surface 22.

FIG. 5 shows the details of the dimples 24 as they are formed in the outer surface 22. Each dimple 24 includes a substantially flat base 58 which is surrounded by a frustoconical section 60 which is inclined away from the base 58 to outer wall 62. The preferred thickness of the outer shell is on the order of two hundred one thousandths, preferably, when high density polyethylene is used as the shell material. However, the thickness of the wall 62 may vary during the rotomolding process due to inconsistencies in the process itself and a thinner or thicker thickness may be desired if other materials are used such as nylon, Teflon TM, polyester or urethane, for example. The preferred interstitial space between the outer surface 64 of the steel tank 66 and the inner surface 68 of the outer wall 62 is on the order of ¼ inch, preferably. Of course, the inner surface 68 of the base 58 of each dimple 24 contacts the outer surface 64 of the steel tank 66.

Figure 6:
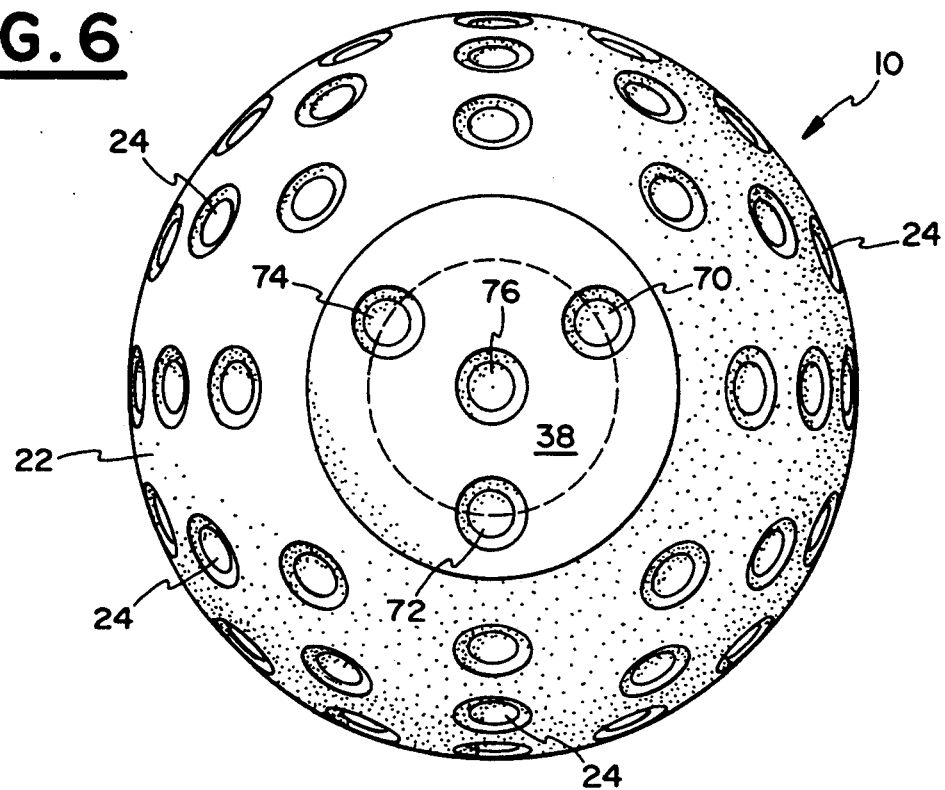
FIG. 6 is a bottom view of the tank.

FIG. 6 shows a bottom view of the vessel 10 and shows the four dimpled areas 70, 72, 74 and 76 located thereon. The dimples are preferably placed in optimum locations as shown to insure balance of the vessel during shipping and during installation.

Figure 7:
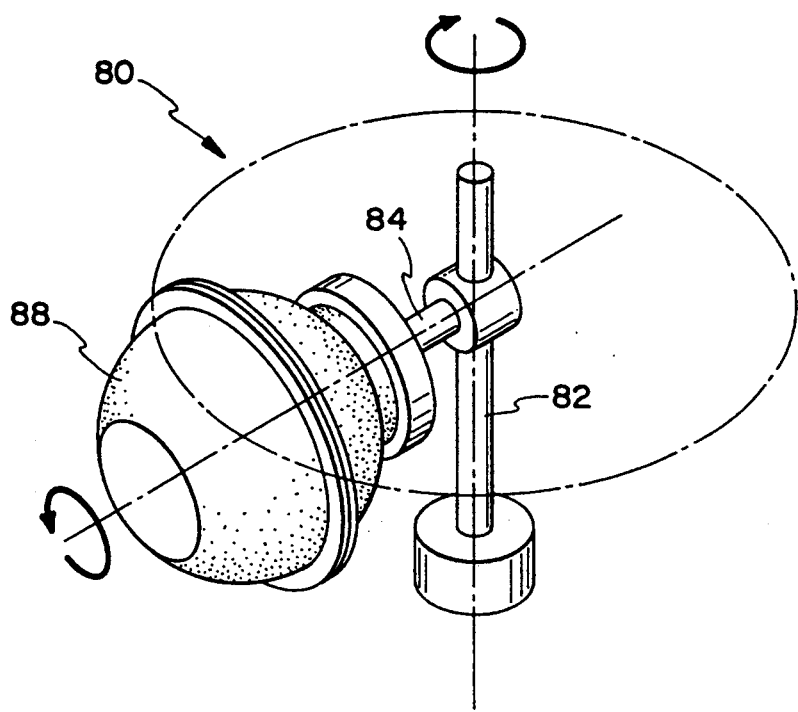
FIG. 7 is a schematic view of the rotomolding apparatus showing the tank connected to the rotomolding arm.

Construction of the vessel 10 is performed by conventional rotomolding techniques generally but does include several specific techniques that will be described below with reference to FIG. 7.

The rotomolding device 80 is connected to the steel tank 66 at three connection points (not shown) corresponding to the opening for the monitor tube 30, the vent opening 32 and the supply opening 34. The rotomolder includes and upstanding column 82 which rotates about its longitudinal axis. Mounted on the support column is a support arm 84 which also rotates about its longitudinal axis. The support arm 84 includes attachment devices for attaching to the openings 30, 32 and 34 in the tank 66 and then the mold is placed about the tank 66 and the shell material is added (usually in powdered form) to the mold 88 and lies within the mold 88 between the outer surface 64 of the tank and the inner wall of the mold (not shown). The mold 88 is rotated on both axes of the column 82 and the support arm 84 and is slowly heated so that the shell material becomes viscous and flows around the interior of the mold. The mold is heated and the rotation spreads the shell material throughout the interior of the mold 88 while the mold 88 rotates at about 15 to 18 revolutions per minute after which the mold is cooled and then removed. As the mold cools, the shell shrinks away from the mold and conforms to the shape of the steel tank 66. It should be understood that a steel tank is typically used, but tanks formed of other materials may be used if they will withstand the heat of the rotomolding process and are compatible with the shell material.

A liner 90 as shown in FIG. 5 may be added inside of the tank 66 to provide additional corrosion protection from the liquids stored therein. The liner 90 may be rotomolded in the interior of the tank 66 by conventional techniques using the materials recited above for the shell 22 or the liner 90 may be painted on the interior of tank 66 by pouring a suitable protective material into the tank 66 prior to rotomolding, which will be spread during the rotomolding process. A preferred liner material is polyester resin, but other materials may be used such as epoxy, urethane or polyethylene, based upon design characteristics including cost and chemical compatibility.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A secondary containment vessel for use in underground storage of fuels and other hazardous fluids, said vessel comprising:
   a) a tank adapted for holding stored fluid, said tank having at least one fluid transfer opening formed therein;
   b) a seamless shell formed about said tank so that interstitial spaces are formed between said shell and said tank;
   c) a sump base located over said tank and surrounding said at least one fluid transfer opening; and
   d) said sump base being formed as one piece with said seamless shell, said sump base having an upper opening and at least one wall forming a tubular sidewall, said sump base further including a bottom wall formed integral with said tubular sidewall such that said bottom wall and said tubular sidewall form a receptacle for leak containment.

2. The vessel as set forth in claim 1, wherein:
   a) said tank is substantially spherical.

3. The vessel as set forth in claim 2, wherein:
   a) said tank includes a flat bottom portion.

4. The vessel as set forth in claim 1, wherein:
   a) said shell is formed of thermoplastic material.

5. The vessel as set forth in claim 1, wherein:
   a) said shell having dimples formed therein; and
   b) said interstitial spaces are formed between dimples in said shell.

6. The vessel as set forth in claim 5, wherein:
   a) said dimples include a flat surface surrounded by a frustoconical surface.

7. The vessel as set forth in claim 6, wherein:
   a) said flat surface contacts said tank and said frustoconical surface extends from said flat surface in a direction away from said tank.

8. The vessel as set forth in claim 1, wherein:
   a) said sump base includes at said top end a flat surface and a laterally offset portion.

9. The vessel as set forth in claim 1, wherein:
   a) a liner is located inside said tank.

10. The vessel as set forth in claim 9, wherein:
    a) said liner is formed of polyester resin.

11. The vessel as set forth in claim 1, wherein:
    a) said shell is formed of high density polyethylene.

12. The vessel as set forth in claim 1, wherein:
    a) said sump base includes a conduit access port formed therein.

13. A secondary containment vessel for use in underground storage of fuels and other hazardous fluids, said vessels comprising:
    a) a tank adapted for holding stored fluid, said tank having at least one fluid transfer opening formed therein;
    b) a seamless shell formed about said tank so that interstitial spaces are formed between said shell and said tank;
    c) a sump base located over said tank and surrounding said at least one fluid transfer opening; and
    d) said sump base being formed as one piece with said seamless shell, said sump base having an upper opening and at least one wall forming a tubular side wall, said sump base further including a bottom wall positioned directly below said upper opening and formed integral with said tubular side wall such that said sump base forms a receptacle for leak containment.

14. The vessel as set forth in claim 13, wherein:
    a) said tank is substantially spherical.

15. The vessel as set forth in claim 13, wherein:
    a) said shell is formed of thermoplastic material.

16. The vessel as set forth in claim 13, wherein:
    a) said shell having dimples formed therein; and
    b) said interstitial spaces are formed between dimples in said shell.

17. The vessel as set forth in claim 13, wherein:
    a) a liner is located inside said tank.

18. The vessel as set forth in claim 13, wherein:
    a) said sump base includes a conduit access port formed therein.

* * * * *